US006551974B1

(12) United States Patent
Conrad et al.

(10) Patent No.: US 6,551,974 B1
(45) Date of Patent: Apr. 22, 2003

(54) POLISH COMPOSITIONS FOR GLOSS ENHANCEMENT, AND METHOD

(75) Inventors: Gregory S. Conrad, Vadnais Heights, MN (US); Michael E. Besse, Golden Valley, MN (US); Terry J. Klos, Victoria, MN (US)

(73) Assignee: Ecolab Inc., St. Paul, MN (US)

( * ) Notice: Subject to any disclaimer, the term of this patent is extended or adjusted under 35 U.S.C. 154(b) by 4 days.

(21) Appl. No.: 09/602,756

(22) Filed: Jun. 23, 2000

Related U.S. Application Data

(63) Continuation-in-part of application No. 09/461,861, filed on Dec. 15, 1999, now Pat. No. 6,339,054, which is a continuation-in-part of application No. 09/295,035, filed on Apr. 20, 1999, now Pat. No. 6,350,725.

(51) Int. Cl.$^7$ .............................. C08J 7/06; C11D 1/38
(52) U.S. Cl. .................... 510/241; 510/417; 510/350
(58) Field of Search ................... 510/241, 238, 510/417, 350; 106/3, 10, 11; 524/104, 110, 376

(56) References Cited

U.S. PATENT DOCUMENTS

| | | |
|---|---|---|
| 2,992,108 A | 7/1961 | Knox et al. |
| 3,068,101 A | 12/1962 | Knox et al. |
| 3,123,640 A | 3/1964 | Longley |
| 3,141,905 A | 7/1964 | Longley |
| 3,165,409 A | 1/1965 | Knox et al. |
| 3,210,152 A | 10/1965 | van Helden et al. |
| 3,573,049 A | 3/1971 | Kalenda |
| 3,668,136 A | 6/1972 | Barker |
| 3,883,356 A | 5/1975 | Syrovatka et al. |
| 4,055,433 A | 10/1977 | Morones |
| 4,093,566 A | 6/1978 | MacNamara et al. |
| 4,137,303 A * | 1/1979 | Gaffar et al. |
| 4,153,571 A | 5/1979 | Garvin et al. |
| 4,284,435 A | 8/1981 | Fox |
| 4,936,914 A * | 6/1990 | Hurley et al. |
| 5,013,622 A | 5/1991 | Simpson et al. |
| 5,710,120 A | 1/1998 | Kaninen et al. |
| 5,827,542 A | 10/1998 | Miner et al. |

FOREIGN PATENT DOCUMENTS

| | | |
|---|---|---|
| EP | 0035381 A1 | 9/1981 |
| EP | 0 449 038 A1 | 10/1991 |
| FR | 1497930 | 9/1967 |
| FR | 1556240 | 12/1968 |
| JP | 56061500 | 5/1981 |
| WO | WO 92/08823 | 5/1992 |

OTHER PUBLICATIONS

"Cationic Quaternary Ammonium Compounds EMCOL CC–9 EMCOL CC–36 EMCOL CC–42", *Witco Chemical: Organics Division*, Bulletin 236 (May 1980).

"EMCOL CC–55" *Witco Chemical: Organics Division*, Bulletin 235 (Sep. 1979).

"EMCOL CC–59" (Product Specification Sheet), *Witco Corporation: Oleochemicals/Surfactants Group* (051095), 1995.

Muller, W.H. et al., "Synthese der Athylester von NTA, ADTA, DTPA und Pyridin–2.6–Dicarbonsaure mit Hilfe von Pyrokohlensaurediathylester", *Archiv der Pharmazie*, pp. 336–340 (1974).

"Nonionic and Ampholytic Surfactants", *Surface Active Agents and Detergents*, vol. II, pp. 120–143 (1958).

KAO Corporation, "WPI World Patent Information Derwent, Derwent, GB," vol. 42, NR 89 XP002006759, abstract only.

* cited by examiner

Primary Examiner—Gregory E. Webb
(74) Attorney, Agent, or Firm—Merchant & Gould P.C.

(57) ABSTRACT

A composition and method for use in imparting or maintaining a glossy or shiny finish on a hard surface. In one embodiment, the composition comprises a base polish component or components, and at least one poly[oxyalkylene] ammonium cationic surfactant. In another embodiment, a method of imparting a glossy finish on a hard surface by applying a composition to the hard surface, the composition comprising at least one poly[oxyalkylene] ammonium cationic surfactant In some such embodiments, the composition comprises a base polish and the poly[oxyalkylene] ammonium cationic surfactant is dispersed in the base polish. Preferably, the poly[oxyalkylene] ammonium cationic surfactant comprises in the range of about 0.01 to about 10 wt. %, more preferably in the range of about 0.05 to about 5 wt. %, and more preferably in the range of about 0.1 to about 1 wt. % of the total composition.

59 Claims, No Drawings

POLISH COMPOSITIONS FOR GLOSS ENHANCEMENT, AND METHOD

RELATED APPLICATION

This application is a continuation-in-part of U.S. patent application Ser. No. 09/461,861 filed Dec. 15, 1999 now U.S. Pat. No. 6,339,054, which is a continuation-in-part of U.S. Patent Application Number U.S. patent application Ser. No. 09/295,035 filed Apr. 20, 1999 now U.S. Pat. No. 6,350,725, both of which are incorporated herein by reference.

FIELD OF THE INVENTION

The invention relates to compositions and methods useful for imparting or maintaining a glossy or shiny finish on a hard surface. More specifically, the invention relates to compositions and methods useful for imparting or maintaining an increased level of gloss or shine to a hard surface, for example, the surface of vehicles such as cars, trucks, vans, buses, railway trains, boats, motorcycles, snowmobiles, trailers, and the like.

BACKGROUND OF THE INVENTION

It is desirable to keep many exposed hard surfaces, such as the surfaces of vehicles, clean and polished for reasons which include at least maintaining the appearance of the surface, minimizing surface tarnishing, reducing paint wear and fading if the surface is painted, and preventing corrosion on the surface. Each of these adverse affects on the hard surfaces of vehicles is at least in part contributed to by materials, which collect on the vehicle during use and storage. It is well known that regular polishing of the vehicle can assist in maintaining the appearance of the vehicle and can even extend its useful life where corrosion damage is concerned. It is therefore desirable to have products available to the market place, which can assist in the polishing of vehicle surfaces.

There is a vast array of polishes commercially available that are intended for use on many surfaces, including vehicles. Many of such polishes may perform a suitable job of imparting a glossy or shiny finish to a surface when used properly. However, it is generally desirable to improve the performance of such polishes, or to provide better polish compositions.

SUMMARY OF THE INVENTION

The inventors have developed a new composition and method for use in imparting or maintaining a glossy or shiny finish on a hard surface. In one embodiment, the composition comprises a base polish component or components, and at least one poly[oxyalkylene] ammonium cationic surfactant. The inventors have discovered that the combination of the at least one poly[oxyalkylene] ammonium cationic surfactant within a polish base component or components provides a final polish composition having improved gloss or shine imparting properties.

Another embodiment is a method of imparting a glossy finish on a hard surface. The method includes applying a composition to the hard surface, the composition comprising at least one poly[oxyalkylene] ammonium cationic surfactant. In some such embodiments, the composition comprises a base polish and the poly[oxyalkylene] ammonium cationic surfactant dispersed in the base polish.

Preferably, the poly[oxyalkylene] ammonium cationic surfactant comprises in the range of about 0.01 to about 10 wt. %, more preferably in the range of about 0.05 to about 5 wt. %, and more preferably in the range of about 0.1 to about 1 wt. % of the total composition.

As used herein "polish" or "polishes" means any solid, semi-solid, or liquid mixture or dispersion that which when used on a surface imparts smoothness, surface protection, or a decorative finish on that surface. The terms "base polish" or "base polish components" or "polish matrix" refers to a polish, or components that can be used to make a polish, that does not include a poly[oxyalkylene] ammonium cationic surfactant. The poly[oxyalkylene] ammonium cationic surfactant is added to the base polish to provide a novel polish composition. Preferred base polishes include those having at least one polishing agent selected from a film forming agent, an abrasive agent, a cleaning agent, or mixtures thereof.

DETAILED DESCRIPTION OF THE PREFERRED EMBODIMENT

In at least one embodiment, the invention comprises a composition n with at least two basic components therein: at least one poly[oxyalkylene] ammonium cationic surfactant, and a base polish.

Poly[oxyalkylene] Ammonium Cationic Surfactant

The alkoxylated (e.g., polyalkylene) ammonium cationic surfactant is an ingredient of particular note within the composition. These cationic surfactants are commercially available, for example, as Witco Chemicals Cationic quaternary ammonium compounds Emcol CC-9, Emcol CC-36, and Emcol CC-42. A preferred compound is commercially provided as GLENSURF™ 42, which is inaccurately described as "Diethylammonium Chloride" in a PRODUCT DATA SHEET provided by Glenn Corporation, which sells the product. The CAS Number for the actual compound is 68132-96-7, its Chemical Abstract name is Poly[oxy(methy-1,2-ethanediyl)], alpha-[2-diethyl Methylammonio) ethyl]-omega-hydroxyl chloride, and its chemical formula is listed as $(C_3H_6O)_nC_7H_{18}NO)$ Cl.

The alkoxylated ammonium cationic surfactants used in the present invention may be generally defined according to the formula:

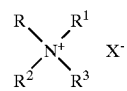

wherein R, $R^1$ and $R^2$ are independently selected from lower alkyl groups (C1–C4 alkyl groups), $R^3$ comprises a polyoxyalkylene chain, and X comprises an anion (any anion is useful, acid anions preferred, such as chloride, iodide, bromide, fluoride, acetate, phosphate, sulfate, etc.). A preferred type of polyoxyalkylene chain (also referred to as a poly[oxyalkylene] chain) would have the general formula:

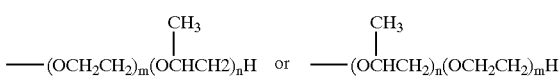

wherein m is from 0 to 30, n is from 1 to 60, and m plus n is from 1 to 60, and n>m. It is preferred that the ratio of n/m is at least 2, more preferred that n/m is at least 4, and still more preferred that n/m is greater than 5 or even that m=0. It is also preferred that m+n is within the range of 5 to 60, still more preferred that m+n is within the range of 8 to 50, the most preferred being where m=0 and n=35–45 (e.g., 42).

The anion is fairly inert in the system except for its solubility characteristics, which are well understood in the art. Simple anions, especially simple or lower molecular weight acid anions such as chloride, bromide, iodide, sulfate, paratoluene sulfonate, acetate, nitrate, nitrite, phosphate, and the like are conveniently selected as the counterion ion in the cationic surfactant. It is an option that the total number of carbon atoms among R, $R^1$ and $R^2$ have a combined number of fewer than 12 carbon atoms (with the possible maximum being 12 carbon atoms). It is an additional option that the total number of carbon atoms in the R, $R^1$ and $R^2$ groups are between 3 and 12 carbon atoms or between 4 and 8 carbon atoms. The most common form of this class of surfactants has R, $R^1$ and $R^2$ as one methyl radical and two ethyl radicals.

In describing compounds by structure and formula in the practice of the invention, it is well understood that substitution of the compounds would be practiced within the background skill of one ordinarily skilled in the art.

These poly[oxyalkylene] ammonium cationic surfactants, by themselves, and particularly in combination with other components of the composition, contribute to the beneficial characteristics of the composition, including: 1) improved overall polishing performance as compared to compositions which are otherwise identical except for the presence of these poly[oxyalkylene] ammonium cationic surfactants; 2) enhanced drying performance when desired in combination with any or all of the remaining components of the compositions; 3) reduced detrimental surface appearance or no detrimental surface appearance (even though the evidence is clear that at least some of the compositions of the invention are persistent and leave material on the polished surface, especially as evidenced by the persistent improved drying rate of the surface after treatment, the appearance of the surface is quite good, with good reflectivity, no dulling or matte-like appearance, and no discoloration); and 4) a substantive glossy or shiny appearance to the finish (providing good reflectivity, and a polished appearance to the surface). These combinations of properties are best obtained by the use of these polyoxyalkylene ammonium cationic surfactants, especially in combination with the rest of the components described below for use in the present invention.

These compounds are described in U.S. Pat. Nos. 3,123,640 and 3,141,905, which are incorporated herein by reference, as cation-active surface-active chemical compounds. The cation-active compounds are quaternary ammonium compounds derived from lower monoalkyl dialkanolamines. The cation-active compounds also include a) dialiphatic, dialkoxylated quaternary ammonium compounds, and b) monoaliphatic, trialkoxylated quaternary ammonium compounds, as described by formulae in the patents, and is useful in the practice of the invention as the polyoxyalkylene ammonium cationic surfactants.

In the description of chemical structures and formulae, where the term "group" is used, that terminology is specifically intended to reflect the ability of one ordinarily skilled in the art to use substituted or unsubstituted materials from within the defined class. With regard to the specific example of "alkyl group," that term would reflect and is intended to cover not only hydrocarbons which literally fit within the definition of alkyl (e.g., methyl, ethyl, propyl, hexyl, cyclohexyl, isooctyl, dodecyl, stearyl and the like), but also those types of substituted alkyl compounds which one of ordinary skill in the art would select for minor or specifically intended variations in the physical and/or chemical properties effected by the substitution such as chloromethyl, hydroxy-ethyl, ethylene sulfonate, 4-cyanobutyl, ethylehne-ethyl ether ($—CH_2CH_2OCH_2CH_3$), ethylene-ethyl thioether, dodecyl carboxylate (and its ester), 3,4-dibromobutyl, and the like. Where the term "alkyl moiety" is used, that term encompasses only unsubstituted alkyl. Similarly, the term a "compound having the central nucleus" refers to all chemical compounds which have the identified chemical structure defined for the nucleus, with the option of having substitution thereon which does not alter the bond structure defined in the formula. For example, a central structure of the formula:

would include, phenyl, para-hydroxy phenyl, 1,3-dichlorophenyl, 2,4,6-trimethylphenyl, naphthyl, benzamidazol (attached through the benzyl ring), and the like, but would not include cyclohexane, piperidine, or the like, as those changes alter the bond structure of the ring. The terminology of a ring or substituent of the formula limits the structure to the specific groups and positions for substitution as shown.

The Base Polish:

As defined above, the terms "base polish" or "base polish components" or "polish matrix" refers to a polish, or components that can be used to make a polish, to which the poly[oxyalkylene] ammonium cationic surfactant is included to provide the composition of the invention. The base polish can be any of a broad variety of polish formulations generally known in the art, and can be in the form of a solid, semi-solid, or liquid. Preferably, the base polish used is formulated such that the poly[oxyalkylene] ammonium cationic surfactants can be suitably dispersed within the base polish.

The base polish preferably includes a vehicle or diluent component into which the other components are dispersed. Preferably, the base polish includes at least one polishing agent component, such as an abrasive, a cleaner, or film former, and other optional ingredients, such as surfactants, emulsifiers, thickeners, stabilizers, drying agents, brightening agents, antifoaming agents, foaming agents, antioxidants, humectants, coupling agents, additional solvents, fragrances, dyes, biocides, and the like, that are useful in providing a homogeneous, stable product that has beneficial use properties, and has enhanced the aesthetic qualities. Preferably, the base polish is an emulsion or a solvent-based dispersion. If the composition is an emulsion, it is preferably either oil in water emulsion, or a water in oil emulsion.

Vehicle or Diluent

The vehicle or diluent is any of a broad variety generally known for use in polish compositions. Examples of suitable vehicles or diluents generally include water, and organic solvents that are preferably not harmful to the surface being treated. Examples of preferred organic solvents include aliphatic hydrocarbons, aromatic hydrocarbons, mineral seal oil, chlorinated organic solvents. These solvents also provide lubricity during mechanical polishing steps. Specific names and trade names would include: mineral spirits/stoddard solvent (saturated C8–C12 hydrocarbons), solvent 140, Isopar (C, E, G, H, K, L, M, V) (commercially available from Exxon Corp.). Most preferably, the base polish is a water in oil, or an oil in water emulsion, or is an aqueous based composition using water as the primary vehicle or diluent.

Polishing Agents

Preferably, one or more polishing agents are dispersed within the vehicle or diluent. The polishing agents act on the surface being treated to impart smoothness, surface protection, or a decorative finish on the surface.

One example of a polishing agent are abrasives. Abrasives are intended to remove contaminants, and provide a smooth glossy texture to the surface being polished. Examples of abrasives include aluminum silicates, diatomaceouis earth, silicates, kaolin clay, attapulgite clay, and other clay bond cleaners, microcrystalline silica, silicon dioxide, polyamide powders, alumina hydrate, amorphous silica and the like, or other materials to provide abrasive material for polishing surfaces, especially vehicle surfaces. Suitable silicates include metasilicates, orthosilicates (such as in the form of sodium or potassium metasilicate or sodium or potassium orthosilicate), and the like.

One suitable source of diatomaceous earth is Super Floss commercially available from Celite Corporation.

Some suitable examples of abrasive silica microcrystalline are Imslil A-8 and Imsil A-10 commercially available from Unimin Specialty Minerals, Inc.

A clay based abrasive that is suitable for use is commercially available from Kaopolite Corp. under the name Kaopolite SF.

Another example of polishing agents includes cleaning agents, which remove contaminants, and provide a smooth glossy texture to the surface being polished. Suitable examples of cleaning agents include alkaline agents, clay based cleaners and others generally known. Clay based cleaners also may act as abrasives, and therefore overlap into the abrasives category. Clays can both remove contaminates and smooth a surface by removing minor scratches.

Preferred cleaning agents include alkaline agents. Many alkaline agents are known in the art, but preferred alkali agents include metal phosphates, metal carbonates, and metal hydroxides, particularly alkali or alkaline metal hydroxides such as NaOH and KOH.

In some examples, the alkaline agents can be combined with a fatty acid ester to form soap. The soap can act as both a cleaner, lubricant, and an emulsifying agent. For example, in some embodiments, KOH and a fatty acid ester, such as oleic acid, can form the soap. One source of suitable oleic acid is Pamak 4A commercially available from Hercules Incorporated.

Other conventional and non-conventional cleaning solution additives may be added in the practice of the present invention. Where shelf stability of the polishing product (as a concentrate or as a ready-to-use product) is important, the cleaner additives should not react with other ingredients to change the performance of the system adversely or cause components to precipitate or separate within the mixture of dispersion.

Another example of polishing agents includes film forming agents. Film forming agents spread over the surface being polished and act to lay down a glossy film on the surface. The film can act in both a protective or decorative function. In some embodiments, buffing of the film forming agent is required to provide a final glossy finish. In other embodiments, no buffing is required. Examples of suitable film forming agents include waxes, silicones, curable resins and liquid hydrocarbon polymers.

Any wax generally known in the art, and that is suitable for use in the composition being formulated can be used. Soft waxes, hard waxes, and blends thereof can be used. Examples of suitable waxes include paraffin, petroleum waxes, such as microcrystalline petroleum waxes, carnauba, candelilla vegetable waxes, montan waxes derived from coal, synthetic polymer waxes, for example oxidized polyethylene, polytetrafluoroethylene (PTFE) and polyamides, and the like, and mixtures thereof. One suitable source of wax is Tomah C-340 Emulsion commercially available from Tomah Products.

Silicones are another type of film forming agents that spread over the surface to provide a protective or decorative film. Any silicone generally known in the art, and that is suitable for use in the particular composition being formulated can be used. Examples of suitable silicones include dimethylsilicones, aminofunctional silicones, and the like. Examples of some suitable sources of silicones are Dow Corning 530 and Dow Corning 531 commercially available from Dow Corning Corporation Additional Ingredients In addition to the diluent or vehicle, and the polishing agents, the base polish, and therefore the final composition, can include additional optional ingredients, such as surface active agents (emulsifying agents, wetting agents, detergents), thickeners, stabilizers, drying agents, brightening agents, antifoaming agents, foaming agents, coupling agents, additional solvents, fragrances, dyes, preservatives, humectants and the like, that are useful in providing a homogeneous, stable product that has beneficial use properties, and has enhanced the aesthetic qualities.

Surface Active Agents

When the composition is a liquid or a semi-solid dispersion, surface active agents, or mixtures thereof, are preferably included to help produce a homogeneous, stable product. Surface active agents are any compound that reduces interfacial tension between two liquids, or between a liquid and a solid, or that reduces surface tension when dissolved in water or water solutions. Examples of surface active agents, or surfactants, include wetting agents, emulsifiers, detergents, and the like.

Preferably, the surfactant or surfactants used are non-ionic or anionic surfactants. A non-ionic, anionic surfactant, or mixtures thereof are preferably used in an amount which would provide the desired effect of solubilizing at least some of the components to provide a stable composition.

Non-ionic and amphoteric surfactants are also well known in the art. Many of these may contain polyoxyalkylene chains within the molecule, with appropriate end groups altering the hydrophilic/hydrophobic balance of the compound. The oxylakylene component is often selected from oxypropylene ($CH_2CH_2CH_2$—O—) or oxyethylene ($CH_2CH_2$—O—) linkages, preferably with the majority or entirety of the groups in the oxyalkylene chain being oxyethylene linkages. More specific known classes of these non-ionic surfactants are known in the literature as non-ionic alkoxylates, non-ionic alkylphenol polyethers, alcohol alkoxylates (e.g., specifically alcohol ethoxylates and alcohol propoxylates and mixed ethoxylates/propbxylates), non-ionic condensates of branched chain primary or secondary alcohols and alkylene (especially ethylene) oxides, alkoxylated amines, amine oxides, non-ionic condensates of fatty acids and alkylene oxides, and the like. These are art-recognized classes well understood by the ordinary surfactant chemist.

Examples of such nonionic surfactants are found in "Surface Active Agents and Detergents," Volumes I and II, Interscience Publications and U.S. Pat. Nos. 2,992,108; 3,068,101; 3,210,152; 3,165,409; and French Patent Nos. 1,556,240 and 1,497,930, all of which are incorporated herein by reference. Amphoteric surfactants are also well known in the literature and include, merely as examples thereof, betaines (such as amidoalkyl betaines), and the like. Examples of such compounds are found in U.S. Pat. No. 3,573,049, which is incorporated herein by reference.

The non-ionic surfactants Tween 60 and Span 80, both commercially available from Uniqema ICI Americas, have been found to be particularly beneficial surfactants in at least some embodiments.

Anionic surfactants are materials well known in the cleaning, detergent, and general materials composition art. Examples of anionic surfactants include organic carboxylates, organic sulfonates, organic sulfates, organic phosphates and the like, particularly linear alkylaryl sulfonates, such as alkylarylcarboxylates, alkylarylsulfonates, alkylarylphosphates, and the like. These are art-recognized classes well understood by the ordinary surfactant chemist.

Thickeners and Stabilizers

Suitable thickeners or stabilizers for use include those generally known in the art, and that are suitable for use in the particular composition being formulated. A thickener, or thickening agent, is any of a variety of substances used to increase the viscosity of liquid or semi-liquid mixtures or solutions, and in some instances, to aid in maintaining stability of such mixtures or solutions by emulsifying properties. Thickeners can also provide flow characteristics as desired, such that the formulation can spread evenly and adhere to vertical surfaces. Examples of suitable thickeners include carboxymethylcellulose, polyacrylates and xanthum gum. One suitable example is carbomer/carbopol 940 commercially available from BF Goodrich.

Thickeners may also act as fillers to increase the bulk or volume of liquid, semi-liquid, or solid mixtures or solutions. Suitable filler material for example, can include talc, clays (kaolin, attapulgite bentonite) and mica. One particularly suitable filler is Satintone 5 clay filler commercially available from Engelhard Corporation. Suitable stabilizers include those generally known in the art, and that are suitable for use in the particular composition being formulated. A stabilizer, or stabilizing agent is any of a number of substances that tends to keep a composition, mixture, or solution from changing its form or chemical nature.

Preservatives

Preservatives can be included in the formulation to maintain or preserve the formulation. Examples of some preservatives include antioxidants and bilocides, and the like. Suitable antioxidants include those generally known in the art for use in polish, and that are suitable for use in the particular composition being formulated. An antioxidant is a particular type of preservative that is added to retard oxidation and deterioration of components of the composition. Some examples include Butylated Hydroxyanisole (BHA), Butylated Hydroxytoluene (BHT), propyl gattate, and others generally known.

Suitable biocides agents include those generally known in the art, and that are suitable for use in the particular composition being formulated. Biocides include any substance that inhibits the growth of microorganisms such as bacteria, molds, slimes, fungi, viruses, and the like. Examples of suitable biocides include methyl and proply parabens, sodium o-phenylphenol, aldehydes (formaldehyde, glutaraldehyde), amines (quaternary compounds, amine and diamine), sulfur compounds (isothiazolone, carbainates, metronidazole), quaternary phosphonium salts, thiazolinones, zinc pyrithione, gluconate, and the like.

Drying Agents

Suitable drying agents include those generally known in the art, and that are suitable for use in the particular composition being formulated. A drying agent is a material that modifies the rate of evaporation for part or all of the liquid portion of the formula. Rate of drying can be important because it determines the length of time that the product can be applied to the surface in a fluid form. It also determines the time required for the mixture to dry on the hard surface prior to other subsequent chemical and mechanical steps. A drying agent primarily affects the evaporation rate by modifying the vapor pressure of the mixture. Typical examples of drying agents are low boiling point solvents. These include aliphatic and aromatic hydrocarbons such as mineral spirits, kerosene, terpines, and chlorinated organic solvents. Particularly suitable drying agents include Isopar K Solvent commercially available by Exxon Chemical and Mineral Spirits 66 made commercially available by Ashland Chemical.

Dyes, Odorants, and other Aesthetic Enhancing Agents

Various dyes, Odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), FD&C Yellow (Pylam Products), Orange (Keystone Analine and Chemical), and the like.

Fragrances or perfumes that may be included in the compositions include, for example, terpenoids such as citronellol, aldehydes such as amyl cinnamaldehyde, a jasmine such as C1S-jasmine or jasmal, vanillin, banana (Arylessence), and the like.

Examples of suitable biocides include methyl and proply parabens, sodium o-phenylphenol, aldehydes (formaldehyde, glutaraldehyde), amines (quaternary compounds, amine and diemine), sulfur compounds (isothiazolone, carbamiates, metronidazole), quaternary phosphonium salts, thiazolinones, zinc pyrithione, gluconate, and the like.

Particularly suitable biocides include Dowicide A and Dowicil 75 commercially available from Dow Chemical Corporation.

Humectants

Humectants may also be included in the formulation, as desired. A humectant is a substance having an affinity for water with stabilizing action on the water content of the formulation. Examples of suitable humectants include glycerol, glycerine and sorbitol.

As will be understood by those of skill in the art, and others, additional ingredients and components can also be included within the base polish, and the composition of the invention. The above discussion illustrates some embodiments of the invention, but is not intended to limit the scope of possible formulations of the invention.

pH

Adjustment of pH can be important in some formulations that involve neutralization of other components to achieve certain functional properties. For example, reacting an alkalinity source with fatty acid to form a soap, or reacting an alkalinity source with polyacylic acid to form a polymer salt that acts as a thickener.

In some embodiments, the compositions hereof will preferably be formulated such that during use in polishing operations, the composition will have a pH of between about 5 and about 13, preferably between about 6 and about 12, and more preferably between about 7 and about 10. Techniques for controlling pH at recommended usage levels include the use of buffers, alkali, acids, etc., and are well known to those skilled in the art, and can be employed in formulating the composition.

The Composition:

As discussed above, the composition of the invention includes at least one poly[oxyalkylene] ammonium cationic surfactant and the base polish, or components of a base polish.

The concentration of the alkoxylated ammonium cationic surfactant within the composition can be varied over a wide range, and the variations have been shown to have significant effects dependent upon which solutions are being used. Although the alkoxylated ammonium cationic surfactant may be used in concentrations of from about 0.01 to about 10% by weight (wt. %) in use compositions, they are preferably provided in amounts of from about 0.05 to about 5 wt. %, and more preferably from about 0.1 to about 1 wt. %. The higher levels of the alkoxylated ammonium cationic surfactant may be particularly beneficial in waxing or polish compositions, the alkoxylated cationic ammonium cationic surfactant acting to provide a significantly and observably better shine when applied in these compositions. The amounts of the alkoxylated ammonium cationic surfactant applied in these polish or wax, compositions may be better provided in the higher end of the concentrations.

One type of preferred embodiment of the invention includes a composition that comprises at least one cationic surfactant comprising at least one poly[oxyalkylene] ammonium cationic surfactant, and a base polish comprising at least one non-ionic surfactant (as defined and described above), at least one diluent or vehicle (as described above), at least one polishing agent (e.g., abrasive, cleaner, or film former, and the like), and optionally the various other types of general ingredients described herein and in the art in general. Such general ingredients might include, for example, thickening agents, drying agents, preservatives, dyes, fragrance, humectants, and the like.

Representative constituent concentrations for components of some compositions embodying the invention can be found in Table 1, wherein the values are given in wt. % of the ingredients in reference to the total composition weight:

TABLE 1

| Component | Preferred wt. % Range | More Preferred wt. % Range | Most Preferred wt. % Range |
|---|---|---|---|
| Diluent or vehicle | 10 to 90 | 20 to 80 | 30 to 70 |
| Polishing agent (abrasive, cleaner, film former, or mixtures thereof) | 5 to 90 | 20 to 80 | 30 to 50 |
| Surface active agents | 0 to 10 | 0.1 to 5.0 | 1.0 to 3.0 |
| Additional Ingredients | 0 to 40 | 0.01 to 30 | 0.1 to 20 |
| poly[oxyalkylene] ammonium cationic surfactants | 0.01 to 10 | 0.05 to 5 | 0.1 to 1 |

Some preferred embodiments comprise the constituent concentrations for base components as found in Table 2, wherein the values are given in wt. % of the ingredients in reference to the total composition weight.

TABLE 2

| Component | Preferred wt. % Range | More Preferred wt. % Range | Most Preferred wt. % Range |
|---|---|---|---|
| Aqueous Diluent | 0 to 90 | 20 to 80 | 30–70 |
| Non-Aqueous Diluent | 0 to 90 | 1 to 50 | 5 to 40 |
| Abrasive Agent | 0 to 30 | 0 to 10 | 0 to 5 |
| Cleaning agent | 0 to 30 | 1.0 to 10 | 2.0 to 10.0 |
| Wax (film forming agent) | 0 to 30 | 0 to 20 | 0 to 10 |
| Silicone (film forming agent) | 0 to 30 | 0 to 20 | 0 to 10 |
| Surfactant | 0 to 10 | 0.1 to 10 | 0.5 to 3.0 |
| Thickeners | 0 to 20 | 0 to 10 | 0.5 to 5.0 |
| Drying Agent | 0 to 60 | 5 to 50 | 10 to 25 |
| Biocide Preservative | 0 to 10 | 0.01 to 1.0 | 0.01 to 0.1 |
| Fragrance | 0 to 10 | 0 to 1.0 | 0 to 0.5 |
| Dye | 0 to 10 | 0 to 1.0 | 0 to 0.1 |
| poly[oxyalkylene] ammonium cationic surfactants | 0.01 to 10 | 0.05 to 5 | 0.1 to 1 |

Depending upon the formulation, as with the base polish, the composition of the invention can be a liquid, semi-liquid, or solid, and can be in the form of a concentrate or ready-to-use formulation. The composition generally has a capability of being used on a wide range of surfaces, and in some embodiments is particularly suited for use on vehicle surfaces.

The compositions embodying the invention can be used in a broad variety of polishing applications. Some examples include manual or machine polishing and the like. These compositions and methods may be used manually, with hand operated polishing equipment or in automatic polishing equipment.

The composition can be used with any suitable application method, known in the art. For example, low pressure application, hand pressure application, water jet spray apparatus or other manual or mechanical application methods and systems can be used, depending upon the form of the polish. Some embodiments of the compositions are applied, allowed to dry, and then removed or buffed off. Other embodiments are applied and worked into the surface immediately. Still other embodiments are applied in a solution, such as an aqueous solutions, and are allowed to dry. For example, some such aqueous based compositions are contemplated to be applied in automatic car wash applications.

The composition can be provided as a ready-to-use formulation, or can be provided as a concentrate designed to be diluted with water or other solvent to form a use formulation. Generally, the ratio of concentrate to solvent (typically water) is within the range of from about 1:300 to 1:10, but may be diluted to any proportion within that range or less efficiently diluted by a lesser amount (e.g., 1:2). In spray on applications, the composition can be either prediluted before being introduced to the spray apparatus, or can be mixed in situ during spraying.

The compositions of the invention, particularly where metal surfaces (including painted or coated metal surfaces, as well as raw or anodized surfaces, such as aluminum) or composite surfaces are desired to be polished, and especially the exterior surfaces of vehicles are to be polished, are particularly effective land beneficial. General areas of use for these materials and processes include, but are not intended to be literally limited to manual, and automatic polishing, and are preferably adapted for use on vehicles, especially for cars, trucks, motorcycles, trains, boats, trailers, and off-road vehicles such as ATV's, and snowmobiles.

The polishing environment may include outside (unenclosed) polishing systems or operations, housed (enclosed) polishing units or operations, transient polishing systems or operations (e.g., where the vehicles move in assembly-line, conveyed fashion through the system, or polish-in-place systems where the vehicle, device or apparatus is placed into a closed environment and the polishing steps are performed on the vehicle device or apparatus while it is confined within the environment.)

There is a definite, observable benefit in the use of the poly[oxyalkylene] ammonium cationic surfactants in polish applications, particularly to car and vehicle bodies during polish operations. There is a visible improvement in the shine or gloss of the surface when the poly[oxyalkylene] ammonium cationic surfactant is present in the polish compositions than in similar polish compositions tried.

The exact functional mechanism by which the alkoxylated ammonium cationic surfactant affects the polishing is not understood. This renders it all the more surprising that an unknown phenomenon is occurring in the application of the alkoxylated ammonium cationic surfactant that provides this unexpected benefit.

The above specification provides a basis for understanding the broad meets and bounds of the invention. The following examples and test data provide an understanding of certain specific embodiments of the invention. The invention will be further described by reference to the following detailed examples. These examples are not meant to limit the scope of the invention that has been set forth in the claims. Variation within the concepts of the invention are apparent to those skilled in the art.

EXAMPLES

Example 1

One Step Cleaner Wax Composition

The components and concentrations for one example of a one step cleaner wax composition embodying the invention is set fourth in Table 3, wherein the values are given in wt. % of the components in reference to the total composition weight:

TABLE 3

ONE STEP CLEANER WAX

| MATERIAL | GENERAL FUNCTION OF COMPONENT | WT. % |
|---|---|---|
| Mineral Spirits | Drying Agent | 20.5322 |
| Dow Corning 530 | Silicone Film Former | 4.2660 |
| Dow Corning 531 | Silicone Film Former | 0.6570 |
| Span 80 | Surfactant | 0.5715 |
| Kaopolite SF | Clay Based Cleaner/Polish | 4.000 |
| Water | Vehicle or Diluent | 60.0533 |
| Satintone 5 | Clay Thickener/Filler | 4.3785 |
| Tomah C-340 Emulsion | Wax film former | 2.4885 |
| Tween 60 | Surfactant | 0.2 |
| Imsil A-8 | Microcrystalline Silica Abrasive | 1.6770 |
| Imsil A-10 | Microcrystalline Silica Abrasive | 0.8330 |
| Dowicide A | Biocide (Preservative) | 0.09 |
| Banana Fragrance | Fragrance | 0.14 |
| FD&C Yellow Dye | Dye | 0.008 |
| Orange Dye | Dye | 0.0050 |
| GLENSURF 42 poly[oxyalkylene] ammonium cationic surfactant | Gloss Enhancement | 0.1 |

The ingredients were added in the order listed using a high shear emulsifier.

Example 2

Automotive Polishing Composition

The components and concentrations thereof for an example of an automotive polishing composition embodying the invention is set fourth in Table 4, wherein the values are given in wt. % of the ingredients in reference to the total composition weight:

TABLE 4

AUTOMOTIVE POLISHING COMPOSITION

| MATERIAL | GENERAL FUNCTION | PERCENT |
|---|---|---|
| Water | Diluent or Vehicle | 43.664 |
| Carbomer 940 | Thickener | 0.08 |
| Dowicil 75 | Biocide/Preservative | 0.056 |
| Glycerine | Humectant/Gloss Enhancement | 2.0 |
| Tween 60 | Surfactant | 1.6 |
| Pamak 4A (Oleic Acid) | Used with KOH, 45%, to form soap/emulsifier | 2.4 |
| Mineral Spirits | Drying aid | 12 |
| Mineral Oil | Diluent/Lubricant | 7.2 |
| Polestar 400 | Clay Cleaner/Polish | 10.4 |
| KOH, 45% | Used with Pamak A4 (Oleic Acid) to form soap/emulsifier | 0.4 |
| Imsil A-8 | Microcrystalline Silica Abrasive | 13.336 |
| Imsil A-10 | Microcrystalline Silica Abrasive | 6.664 |
| GLENSURF 42 | poly[oxyalkylene] ammonium cationic surfactant | 0.1 |

The ingredients were added in the order listed using a high shear emulsifier.

Example 3

Laboratory Comparative Testing

Laboratory evaluations were conducted comparing the gloss imparted on a surface by a standard polishing compound product and a modified version of the same product including a small amount of Glensurf 42 cationic surfactant. Four different laboratory evaluations were conducted.

Laboratory Testing Procedures:

The laboratory evaluations comparing polishing compositions was conducted according to the following general procedure:

1. Two sections of a roof cut-out panel were wet sanded by hand with 1,500 grit sandpaper.
2. Glossmeter readings were taken on both sections to assess the level of gloss. A Gardner glossmeter was used.
3. Product was applied to each of the two sections. One section made use of the standard polishing compound product and the other section used a modified version of the same product. In the evaluations considered here the modification was to add a small amount of GLENSURF™ 42 cationic surfactant.
4. A wool buffer pad was used to distribute the products about the panel section. A different wool pad was used for each product.
5. The high speed buffer (1,800 RPM), having the attached wool pad designated for that product, was then turned-on. The panel sections were buffed in a similar manner.
6. Following the high speed buffing with the wool pad, the gloss of the panel section was measured in ten locations.

7. A second application of the same product was made to each of the sections.
8. A high speed buffer (1,800 RPM), having a foam pad was used. A different pad was used for the two sections. One for the standard product and one for the product containing the GLENSURF™ 42 cationic surfactant. The panel sections was buffed in a "checker board" pattern of two directions. Both sections were buffed in a similar manner.
9. Following the high speed buffing with the foam pad, the gloss of the panel section was measured in ten locations.
10. As a final possible application step the same products were applied to the same panel sections using an orbital buffer. The product was applied by smearing it on the foam orbital buffer pad. A different pad was used for each of the products; one for standard product and one for the one containing the GLENSURF™ 42 cationic surfactant. Following the high speed buffing with the orbital buffer, the gloss of the panel section was measured in ten locations. ps Result of Lab Testing:

A. Evaluation 1

Compositions Tested:

1. S-NG-0.0GL (no GLENSURF™ 42), having the following formulation:

| MATERIAL | WT. % |
| --- | --- |
| Water | 32.329 |
| Carbomer 940 | 0.1 |
| Dowicil 75 | 0.070 |
| Tween 60 | 2.0 |
| Pamak 4A (Oleic Acid) | 3.0 |
| Mineral Spirits | 15 |
| Mineral Oil | 9 |
| Polestar 400 | 13 |
| KOH, 45% | 0.5 |
| Imsil A-8 | 16.665 |
| Imsil A-10 | 8.335 |
| Glensurf 42 | 0.0 |

2. S-NG-0.2GL (GLENSURF™ 42 included), having the following formulation:

| MATERIAL | WT. % |
| --- | --- |
| Water | 32.265 |
| Carbomer 940 | 0.100 |
| Dowicil 75 | 0.070 |
| Tween 60 | 1.996 |
| Pamak 4A (Oleic Acid) | 2.994 |
| Mineral Spirits | 14.970 |
| Mineral Oil | 8.982 |
| Polestar 400 | 12.974 |
| KOH, 45% | 0.499 |
| Imsil A-8 | 16.632 |
| Imsil A-10 | 8.318 |
| Glensurf 42 | 0.200 |

Characteristics of Test Panel

Panel Color: Light Gray
Panel Condition: Good, some surface imperfections
Paint Thickness: 3.3–3.6 mil Initial Gloss Readings (Results of Gloss readings from Step 2 of the Testing Procedure):

| Side | Left | Left | Right | Right |
| --- | --- | --- | --- | --- |
| Polishing Product | None | None | None | None |
| Process | Wet Sand | Wet Sand | Wet Sand | Wet Sand |
| Buffing/Orbital Speed | By Hand | By Hand | By Hand | By Hand |
| Gloss Reading Angle | 60 | 20 | 60 | 20 |
| # of Gloss Readings | 10 | 10 | 10 | 10 |
| Average Gloss Reading | 4.71 | 1.58 | 5.25 | 1.47 |
| Standard Deviation | 0.60 | 0.68 | 0.48 | 0.11 |

Comparative Gloss Readings After Treatment with Wool Buffer (Results of Gloss readings from Step 6 of the Testing Procedure):

| Side | Left | Left | Right | Right |
| --- | --- | --- | --- | --- |
| Polish Product | S-NG-0.0GL | S-NG-0.0GL | S-NG-0.2GL | S-NG-0.2GL |
| Process | Wool Buff | Wool Buff | Wool Buff | Wool Buff |
| Buffer/Orbital Speed | 1800 | 1800 | 1800 | 1800 |
| Gloss Reading Angle | 60 | 20 | 60 | 20 |
| # of Gloss Readings | 10 | 10 | 10 | 10 |
| Average | 79.08 | 64.52 | 83.19 | 69.79 |
| Standard Deviation | 0.96 | 4.53 | 1.82 | 1.22 |

Comparative Gloss Readings After Treatment with Foam Buffer (Results of Gloss readings from Step 9 of the Testing Procedure):

| Side | Left | Left | Right | Right |
| --- | --- | --- | --- | --- |
| Polish Product | S-NG-0.0GL | S-NG-0.0GL | S-NG-0.2GL | S-NG-0.2GL |
| Process | Foam Buff | Foam Buff | Foam Buff | Foam Buff |
| Buffer/Orbital Speed | 1800 | 1800 | 1800 | 1800 |
| Gloss Reading Angle | 60 | 20 | 60 | 20 |
| # of Readings | 10 | 10 | 10 | 10 |
| Average | 83.04 | 67.2 | 85.23 | 74.07 |
| Standard Deviation | 0.82 | 3.67 | 0.66 | 1.45 |

Comparative Gloss Readings After Treatment with Orbital Buffer (Results of Gloss readings from Step 10 of the Testing Procedure):

| Side | Left | Left | Right | Right |
| --- | --- | --- | --- | --- |
| Polish Product | S-NG-0.0GL | S-NG-0.0GL | S-NG-0.2GL | S-NG-0.2GL |
| Process | Orbital Foam | Orbital Foam | Orbital Foam | Orbital Foam |
| Buffer/Orbital Speed | 1745 | 1745 | 1745 | 1745 |
| Gloss Reading Angle | 60 | 20 | 60 | 20 |
| # of Readings | 10 | 10 | 10 | 10 |
| Average | 86.45 | 74.18 | 87.83 | 79.81 |
| Standard Deviation | 1.63 | 4.83 | 1.43 | 0.69 |

B. Evaluation 2

Compositions Tested:

1. S-NG-0.0GL (no GLENSURF™ 42), having the following formulation:

| MATERIAL | WT. % |
|---|---|
| Water | 32.329 |
| Carbomer 940 | 0.1 |
| Dowicil 75 | 0.070 |
| Tween 60 | 2.0 |
| Pamak 4A (Oleic Acid) | 3.0 |
| Mineral Spirits | 15 |
| Mineral Oil | 9 |
| Polestar 400 | 13 |
| KOH, 45% | 0.5 |
| Imsil A-8 | 16.665 |
| Imsil A-10 | 8.335 |
| Glensurf 42 | 0.0 |

2. S-NG-0.2GL (GLENSURF™ 42 included), having the following formulation:

| MATERIAL | WT. % |
|---|---|
| Water | 32.265 |
| Carbomer 940 | 0.100 |
| Dowicil 75 | 0.070 |
| Tween 60 | 1.996 |
| Pamak 4A (Oleic Acid) | 2.994 |
| Mineral Spirits | 14.970 |
| Mineral Oil | 8.982 |
| Polyetar 400 | 12.974 |
| KOH, 45% Satintone 5 | 0.499 |
| Imsil A-8 | 16.632 |
| Imsil A-10 | 8.318 |
| Glensurf 42 | 0.200 |

Characteristics of Panel Tested

Panel Color: Light Gray

Panel Condition: Good, some surface imperfections

Paint Thickness: 2.9–3.4 mil

Initial Gloss Readings (Results of Gloss readings from Step 2 of the Testing Procedure):

| Side | Left | Left | Right | Right |
|---|---|---|---|---|
| Polishing Product | None | None | None | None |
| Process | Wet Sand | Wet Sand | Wet Sand | Wet Sand |
| Buffing/Orbital Speed | By Hand | By Hand | By Hand | By Hand |
| Gloss Reading Angle | 60 | 20 | 60 | 20 |
| # of Gloss Readings | 10 | 10 | 10 | 10 |
| Average Gloss Reading | 5.13 | 1.38 | 4.64 | 1.29 |
| Standard Deviation | 0.45 | 0.10 | 0.56 | 0.16 |

Comparative Gloss Readings After Treatment with Wool Buffer (Results of Gloss readings from Step 6 of the Testing Procedure):

| Side | Left | Left | Right | Right |
|---|---|---|---|---|
| Polish Product | S-NG-0.2GL | S-NG-0.2GL | S-NG-0.0GL | S-NG-0.0GL |
| Process | Wool Buff | Wool Buff | Wool Buff | Wool Buff |
| Buffer/Orbital Speed | 1800 | 1800 | 1800 | 1800 |
| Gloss Reading Angle | 60 | 20 | 60 | 20 |
| # of Gloss Readings | 10 | 10 | 10 | 10 |
| Average | 82.08 | 67.74 | 79.97 | 64.42 |
| Standard Deviation | 2.35 | 2.67 | 2.29 | 1.30 |

Comparative Gloss Readings After Treatment with Foam Buffer (Results of Gloss readings from Step 9 of the Testing Procedure):

| Side | Left | Left | Right | Right |
|---|---|---|---|---|
| Polish Product | S-NG-0.2L | S-NG-0.2L | S-NG-0.0L | S-NG-0.0L |
| Process | Foam Buff | Foam Buff | Foam Buff | Foam Buff |
| Buffer/Orbital Speed | 1800 | 1800 | 1800 | 1800 |
| Gloss Reading Angle | 60 | 20 | 60 | 20 |
| # of Readings | 10 | 10 | 10 | 10 |
| Average | 85.59 | 70.11 | 80.09 | 64.68 |
| Standard Deviation | 2.84 | 3.02 | 1.71 | 0.57 |

Comparative Gloss Readings After Treatment with Orbital Bufferl (Results of Gloss readings from Step 10 of the Testing Procedure):

| Side | Left | Left | Right | Right |
|---|---|---|---|---|
| Polish Product | S-NG-0.2L | S-NG-0.2L | S-NG-0.0L | S-NG-0.0L |
| Process | Orbital Foam | Orbital Foam | Orbital Foam | Orbital Foam |
| Buffer/Orbital Speed | 1745 | 1745 | 1745 | 1745 |
| Gloss Reading Angle | 60 | 20 | 60 | 20 |
| # of Readings | 10 | 10 | 10 | 10 |
| Average | 86.45 | 78.18 | 85.93 | 77.35 |
| Standard Deviation | 1.63 | 1.90 | 2.29 | 1.50 |

C. Evaluation 3

Compositions Tested:

1. S-NG-0.0GL (no GLENSURF™ 42), having the following formulation:

| MATERIAL | WT. % |
|---|---|
| Water | 32.329 |
| Carbomer 940 | 0.1 |
| Dowicil 75 | 0.070 |
| Tween 60 | 2.0 |
| Pamak 4A (Oleic Acid) | 3.0 |
| Mineral Spirits | 15 |
| Mineral Oil | 9 |
| Polestar 400 | 13 |
| KOH, 45% | 0.5 |
| Imsil A-8 | 16.665 |
| Imsil A-10 | 8.335 |
| Glensurf 42 | 0.0 |

2. S-NG-0.1GL (GLENSURF™ 42 included), having the following formulation:

| MATERIAL | WT. % |
|---|---|
| Water | 32.297 |
| Carbomer 940 | 0.100 |
| Dowicil 75 | 0.070 |
| Tween 60 | 1.998 |
| Pamak 4A (Oleic Acid) | 2.997 |
| Mineral Spirits | 14.985 |
| Mineral Oil | 8.991 |
| Polestar 400 | 12.987 |
| KOH, 45% | 0.500 |
| Imsil A-8 | 16.649 |
| Imsil A-10 | 8.327 |
| Glensurf 42 | 0.100 |

Characteristics of Panel Tested

Panel Color: Black
Panel Condition: Good
Paint Thickness: Not Measured
Initial Gloss Readings (Results of Gloss readings from Step 2 of the Testing Procedure):

| Side | Left | Right |
|---|---|---|
| Polishing Product | None | None |
| Process | Wet Sand | Wet Sand |
| Buffing/Orbital Speed | By Hand | By Hand |
| Gloss Reading Angle | 60 | 60 |
| # of Gloss Readings | 5 | 5 |
| Average Gloss Reading | 4.72 | 5.46 |
| Standard Deviation | 0.20 | 0.56 |

Comparative Gloss Readings After Treatment with Wool Buffer (Results of Gloss readings from Step 6 of the Testing Procedure):

| Side | Left | Right |
|---|---|---|
| Polish Product | S-NG-0.1GL | S-NG-0.0GL |
| Process | Wool Buff | Wool Buff |
| Buffer/Orbital Speed | 1800 | 1800 |
| Gloss Reading Angle | 60 | 60 |
| # of Gloss Readings | 10 | 10 |
| Average | 81.73 | 80.98 |
| Standard Deviation | 0.30 | 0.29 |

Comparative Gloss Readings After Treatment with Foam Buffer (Results of Gloss readings from Step 9 of the Testing Procedure):

| Side | Left | Right |
|---|---|---|
| Polish Product | S-NG-0.1L | S-NG-0.0L |
| Process | Foam Buff | Foam Buff |
| Buffer/Orbital Speed | 1800 | 1800 |
| Gloss Reading Angle | 60 | 60 |
| # of Readings | 10 | 10 |
| Average | 89.45 | 85.56 |
| Standard Deviation | 0.83 | 0.33 |

Comparative Gloss Readings After Treatment with Orbital Buffer (Results of Gloss readings from Step 10 of the Testing Procedure):

| Side | Left | Right |
|---|---|---|
| Polish Product | S-NG-0.1L | S-NG-0.0L |
| Process | Orbital Foam | Orbital Foam |
| Buffer/Orbital Speed | 1745 | 1745 |
| Gloss Reading Angle | 60 | 60 |
| # of Readings | 10 | 10 |
| Average | 89.36 | 87.46 |
| Standard Deviation | 0.62 | 0.51 |

D. Evaluation 4

Compositions Tested:

1. S-NG-0.0GL (no GLENSURF™ 42), having the following formulation:

| MATERIAL | WT. % |
|---|---|
| Water | 32.329 |
| Carbomer 940 | 0.1 |
| Dowicil 75 | 0.070 |
| Tween 60 | 2.0 |
| Pamak 4A (Oleic Acid) | 3.0 |
| Mineral Spirits | 15 |
| Mineral Oil | 9 |
| Polestar 400 | 13 |
| KOH, 45% | 0.5 |
| Imsil A-8 | 16.665 |
| Imsil A-10 | 8.335 |
| Glensurf 42 | 0.0 |

2. S-NG-1.0GL (GLENSURF™ 42 included), having the following formulation:

| MATERIAL | WT. % |
|---|---|
| Water | 32.009 |
| Carbomer 940 | 0.099 |
| Dowicil 75 | 0.069 |
| Tween 60 | 1.980 |
| Pamak 4A (Oleic Acid) | 2.970 |
| Mineral Spirits | 14.852 |
| Mineral Oil | 8.911 |
| Polestar 400 | 12.871 |
| KOH, 45% | 0.495 |
| Imsil A-8 | 16.500 |
| Imsil A-10 | 8.253 |
| Glensurf 42 | 1.000 |

Characteristics of Panel Tested

Panel Color: Brownish Gray (light rose)
Panel Condition: Good
Paint Thickness: 2.3–2.6 mil
Initial Gloss Readings (Results of Gloss readings from Step 2 of the Testing Procedure):

| Side | Left | Left | Right | Right |
|---|---|---|---|---|
| Polishing Product | None | None | None | None |
| Process | Wet Sand | Wet Sand | Wet Sand | Wet Sand |
| Buffing/Orbital Speed | By Hand | By Hand | By Hand | By Hand |

-continued

| Side | Left | Left | Right | Right |
|---|---|---|---|---|
| Gloss Reading Angle | 60 | 20 | 60 | 20 |
| # of Gloss Readings | 10 | 10 | 10 | 10 |
| Average Gloss Reading | 4.48 | 1.83 | 5.66 | 1.98 |
| Standard Deviation | 0.30 | 0.05 | 0.46 | 0.06 |

Comparative Gloss Readings After Treatment with Wool Buffer (Results of Gloss readings from Step 6 of the Testing Procedure):

| Side | Left | Left | Right | Right |
|---|---|---|---|---|
| Polish Product | S-NG-1.0GL | S-NG-1.0GL | S-NG-0.0GL | S-NG-0.0GL |
| Process | Wool Buff | Wool Buff | Wool Buff | Wool Buff |
| Buffer/Orbital Speed | 1800 | 1800 | 1800 | 1800 |
| Gloss Reading Angle | 60 | 20 | 60 | 20 |
| # of Gloss Readings | 10 | 10 | 10 | 10 |
| Average | 91.94 | 75.74 | 89.18 | 76.66 |
| Standard Deviation | 0.53 | 0.84 | 1.36 | 0.47 |

Comparative Gloss Readings After Treatment with Foam Buffer (Results of Gloss readings from Step 9 of the Testing Procedure):

| Side | Left | Left | Right | Right |
|---|---|---|---|---|
| Polish Product | S-NG-1.0GL | S-NG-1.0GL | S-NG-0.0GL | S-NG-0.0GL |
| Process | Foam Buff | Foam Buff | Foam Buff | Foam Buff |
| Buffer/Orbital Speed | 1800 | 1800 | 1800 | 1800 |
| Gloss Reading Angle | 60 | 20 | 60 | 20 |
| # of Gloss Readings | 10 | 10 | 10 | 10 |
| Average | 95 | 83.17 | 94.32 | 78.87 |
| Standard Deviation | 0.30 | 2.05 | 0.39 | 0.91 |

Comparative Gloss Readings After Treatment with Orbital Buffer (Results of Gloss readings from Step 10 of the Testing Procedure):

| Side | Left | Left | Right | Right |
|---|---|---|---|---|
| Polish Product | S-NG-1.0GL | S-NG-1.0GL | S-NG-0.0GL | S-NG-0.0GL |
| Process | Orbital Foam | Orbital Foam | Orbital Foam | Orbital Foam |
| Buffer/Orbital Speed | 1745 | 1745 | 1745 | 1745 |
| Gloss Reading Angle | 60 | 20 | 60 | 20 |
| # of Readings | 10 | 10 | 10 | 10 |
| Average | 93.47 | 81.06 | 90.21 | 78.84 |
| Standard Deviation | 0.33 | 0.56 | 0.62 | 1.09 |

The results from the above testing clearly show that polish compositions including the GLENSURF™ 42 (a poly[oxyalkylene] ammonium cationic, surfactant) have gloss enhancement properties superior to those compositions without a poly[oxyalkylene] ammonium cationic surfactant.

Example 4

Comparative Field Testing

Field evaluation was conducted by a person experienced and trained in the art of using these type of products. The evaluator was instructed to apply both of the test products in the same manner.

The test products were a one-step cleaner wax, REVIVE-IT DB, that did not contain the GLENSURF™ 42 and another one-step cleaner wax, Revive-It DBA, that contained GLENSURF™ 42. The two products had the following formulations:

1. Revive-It DB formulation without GLENSURF™ 42:

| MATERIAL | GENERAL FUNCTION OF COMPONENT | WT. % |
|---|---|---|
| Mineral Spirits | Drying Agent | 20.5322 |
| Dow Corning 530 | Silicone Film Former | 4.266 |
| Dow Corning 531 | Silicone Film Former | 0.657 |
| Span 80 | Surfactant | 0.5715 |
| Kaopolite SF | Clay Cleaner/Polish | 4.000 |
| Water | Diluent or Vehicle | 60.153 |
| Satintone 5 | Clay Thickener/Filler | 4.3785 |
| Tomah C-340 Emulsion | Wax Film Former | 2.4885 |
| Tween 60 | Surfactant | 0.2 |
| Imsil A-8 | Microcrystalline Silica Abrasive | 1.677 |
| Imsil A-10 | Microcrystalline Silica Abrasive | 0.833 |
| Dowicide A | Preservative/Biocide | 0.09 |
| Banana Fragrance | Fragrance | 0.14 |
| FD&C Yellow Dye | Dye | 0.008 |
| Orange Dye | Dye | 0.005 |
| Glensurf 42 | Gloss Enhancement | 0.0 |

2. Revive-It DBA formulation with GLENSURF™ 42:

| MATERIAL | GENERAL FUNCTION OF COMPONENT | WT. % |
|---|---|---|
| Mineral Spirits | Drying Agent | 20.329 |
| Dow Corning 530 | Silicone Film Former | 4.224 |
| Dow Corning 531 | Silicone Film Former | 0.650 |
| Span 80 | Surfactant | 0.566 |
| Kaopolite SF | Clay Cleaner/Polish | 3.960 |
| Water | Diluent or Vehicle | 60.449 |
| Satintone 5 | Clay Thickener/Filler | 4.335 |
| Tomah C-340 Emulsion | Wax Film Former | 2.464 |
| Tween 60 | Surfactant | 0.198 |
| Imsil A-8 | Microcrystalline Silica Abrasive | 1.660 |
| Imsil A-10 | Microcrystalline Silica Abrasive | 0.825 |
| Dowicide A | Preservative/Biocide | 0.089 |
| Banana Fragrance | Fragrance | 0.139 |
| FD&C Yellow Dye | Dye | 0.008 |
| Orange Dye | Dye | 0.005 |
| Glensurf 42 | Gloss Enhancement | 0.099 |

The evaluator applied both formulations to a Toyota Camry having dark green paint with shallow to deep scratches and light oxidation. After application, each product was buffed with a high speed buffer at 1800 rpm.

After performing the test, the evaluator completed an evaluation form rating the products on a scale of 1 to 5, with 1 being poor, and 5 being excellent. The evaluator was also asked to provide additional comments.

The formulation without the GLENSURF™ 42 was rated as a 3. The evaluator also indicated that a lot of dust was produced during buffing, and the resulting shine was not as great as the shine produced by the product including GLENSURF™ 42.

The formulation including the GLENSURF™ 42 was rated as a 4. The evaluator also indicated that there was little dusting during buffing, and that a deeper shine was produced in comparison to the product not including the GLENSURF™ 42.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A composition useful for imparting a glossy finish on a hard surface, the composition comprising:
    at least one poly(oxyalkylene) ammonium cationic surfactant, wherein the poly(oxyalkylene) ammonium cationic surfactant comprises a compound of the formula:

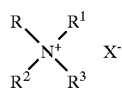

wherein R, $R^1$ and $R^2$ are independently selected from lower alkyl groups, $R^3$ comprises a polyoxyalkylene chain, and $R^-$ comprises an anion; and
    a base polish.

2. The composition of claim 1, wherein polyoxyalkylene chain is a group comprising a formula selected from:

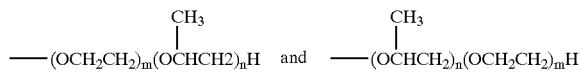

wherein m is from 0 to 30, n is from 1 to 60, and m plus n is from 1 to 60, and n>m.

3. The composition of claim 2, wherein the ratio of n/m is at least 2.

4. The composition of claim 3, wherein the ratio of n/m is at least 4.

5. The composition of claim 2, wherein m plus n is within the range of 5 to 60.

6. The composition of claim 1, wherein the poly(oxyalkylene) ammonium cationic surfactant comprises in the range of 0.01 to 10% by weight of the total composition.

7. The composition of claim 6, wherein the poly(oxyalkylene) ammonium cationic surfactant comprises in the range of 0.05 to 5% by weight of the total composition.

8. The composition of claim 7, wherein the poly(oxyalkylene) ammonium cationic surfactant comprises in the range of 0.1 to 1% by weight of the total composition.

9. The composition of claim 1, wherein the base polish comprises:
    a vehicle or diluent;
    an anionic or nonionic surfactant; and
    a polishing agent;
    and wherein the poly(oxyalkylene) ammoniumn cationic surfactant is dispersed within the base polish.

10. The composition of claim 9, wherein the composition comprises:
    from about 10 to about 90% by weight vehicle or diluent;
    from about 0.1 to about 10% by weight anionic or nonionic surfactant;
    from about 5 to about 90% by weight polishing agent; and
    from about 0.01 to about 0% by weight poly(oxyalkylene) ammonium cationic surfactant.

11. The composition of claim 9 wherein the polishing agent is selected from an abrasive, a cleaner, film forming agent, and mixtures thereof.

12. The composition of claim 1, wherein the composition is an oil in water emulsion.

13. The composition of claim 1, wherein the composition is a water in oil emulsion.

14. A composition useful for imparting a glossy finish on a hard surface, the composition comprising:
    from about 10 to about 90% by weight vehicle or diluent;
    from about 0.1 to about 10% by weight anionic or nonionic surfactant;
    from about 5 to about 90% by weight polishing agent; and
    from about 0.01 to about 10% by weight poly(oxyalkylene) ammonium cationic surfactant, wherein the poly(oxyalklene) ammonium cationic surfactant comprises a compound of the formula:

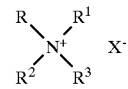

wherein R, $R^1$ and $R^2$ are independently selected from lower alkyl groups, $R^3$ comprises a polyoxyalkylene chain, and $R^-$ comprises an anionherein R, $R^1$ and $R^2$ are independently selected from lower alkyl groups, $R^3$ comprises a polyoxyalkylene chain, and $R^-$ comprises an anion.

15. The composition of claim 14, wherein the polyoxyalkylene chain comprises a group selected from the formulas:

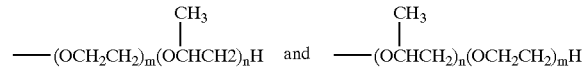

wherein m is from 0 to 30, n is from 1 to 60, and m plus n is from 1 to 60, and n>m.

16. The composition of claim 15, wherein n/m is at least 5.

17. The composition of claim 15, wherein m plus n is within the range of 8 to 50.

18. The composition of claim 15, wherein m is 0 and n is in the range of 35 to 45.

19. The composition of claim 14, wherein $X^-$ is an anion is selected from chloride, bromide, iodide, sulfate, paratoluene sulfonate, acetate, nitrate, nitrite, phosphate, and mixtures thereof.

20. The composition of claim 14, wherein the poly(oxyalkylene) ammonium cationic surfactant comprises in the range of 0.05 to 5% by weight of the total composition.

21. The composition of claim 20, wherein the poly(oxyalkylene) ammonium cationic surfactant comprises in the range of 0.1 to 1% by weight of the total composition.

22. The composition of claim 14, further including additional components selected from: additional surfactant, thickener, stabilizer, drying agent, brightening agent, antifoaming agent, foaming agent, coupling agent, additional solvent, humectant, fragrance, dye, preservative, and mixtures thereof.

23. A method of imparting a glossy finish to a vehicle surface, the method comprising:
    applying a composition to the vehicle surface, the composition comprising at least one poly(oxyalkylene) ammonium cationic surfactant.

24. The method of claim 23, wherein the composition comprises a base polish and the poly(oxyalkylene) ammonium cationic surfactant dispersed in the base polish.

25. The method of claim 23, wherein the poly (oxyalkylene) ammonium cationic surfactant comprises a compound of the formula:

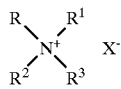

wherein R, $R^1$ and $R^2$ are independently selected from lower alkyl groups, $R^3$ comprises a polyoxyalkyl chain, and $X^-$ comprises an anion.

26. The method of claim 25, wherein polyoxyalkylene chain is a group comprising a formula selected from:

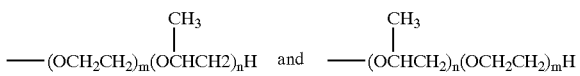

wherein m is from 0 to 30, n is from 1 to 60, and m plus n is from 1 to 60, and n>m.

27. The method of claim 26, wherein the ratio of n/m is at least 2.

28. The method of claim 26, wherein m plus n is within the range of 5 to 60.

29. The method of claim 23, wherein the poly (oxyalkylene) ammonium cationic surfactant comprises in the range of 0.01 to 10% by weight of the total composition.

30. The method of claim 24, wherein the base polish comprises:
 a vehicle or diluent;
 a anionic or nonionic surfactant; and
 a polishing agent.

31. The method of claim 30, wherein the composition comprises:
 from about 10 to about 90% by weight vehicle or diluent;
 from about 0.1 to about 10% by weight anionic or nonionic surfactant;
 from about 5 to about 90% by weight polishing agent; and
 from about 0.01 to about 10% by weight poly (oxyalkylene) ammonium cationic surfactant.

32. The method of claim 23, further including the step of buffing the composition on the surface.

33. A method of imparting a glossy finish on a hard surface, the method comprising:
 applying a polish composition to the surface, the polish composition comprising:
 from about 10 to about 90% by weight vehicle or diluent;
 from about 0.1 to about 10% by weight anionic or nonionic surfactant;
 from about 5 to about 90% by weight polishing agent; and
 from about 0.01 to about 10% by weight poly (bxyalkylene) ammonium cationic surfactant, wherein the poly(oxyalkylene) ammonium cationic surfactant comprises a compound of the formula:

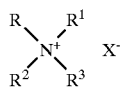

wherein R, $R^1$ and $R^2$ are independently selected from lower alkyl groups, $R^3$ comprises a polyoxyalkylene chain, and $R^-$ comprises an anion.

34. The method of claim 33, wherein the polyoxyalkylene chain comprises a group selected from the formulas:

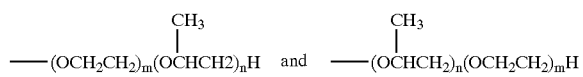

wherein m is from 0 to 30, n is from 1 to 60, and m plus n is from 1 to 60, and n>m.

35. The method of claim 34, wherein n/m is at least 5.

36. The method of claim 34, wherein m plus n is within the range of 8 to 50.

37. The method of claim 34, wherein m is 0 and n is in the range of 35 to 45.

38. The method of claim 33, herein $X^-$ is an anion is selected from chloride, bromide, iodide, sulfate, paratoluene sulfonate, acetate, nitrate, nitrite, phosphate, and mixtures thereof.

39. The method of claim 33, wherein the poly (oxyalkylene) ammonium cationic surfactant comprises in the range of 0.05 to 5% by weight of the total composition.

40. The method of claim 39, wherein the polish composition comprises 0.1 to 1% by weight of the poly (oxyalkylene) ammonium cationic surfactant.

41. The method of claim 33, wherein the composition further includes additional components selected from: surfactant, thickener, stabilizer, drying agent, brightening agent, antifoaming agent, foaming agent, coupling agent, additional solvent, fragrance, preservative, dye, humectant, and mixtures thereof.

42. A composition useful for imparting a glossy finish on a hard surface, the composition comprising:
 at least one poly(oxypropylene) ammonium cationic surfactant, wherein the poly(oxyalkylene) ammonium cationic surfactant comprises a compound of the formula;

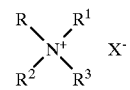

wherein R, $R^1$ and $R^2$ are independently selected from lower alkyl groups, $R^3$ comprises a polyoxyalkylene chain, and $R^-$ comprises an anion; and
 a base polish, wherein the base polish includes a vehicle or diluent component into which other components are dispersed and a polishing agent.

43. The composition of claim 42, wherein the poly (oxypropylene) chain is a group comprising a formula selected from:

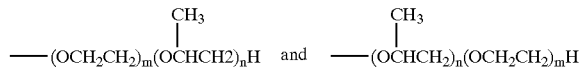

wherein m is from 0 to 30, n is from 1 to 60, and m+n is from 1 to 60, and n>m.

44. The composition of claim 43, wherein m+n is within the range of 5 to 60.

45. The composition of claim 42, wherein the composition comprises 0.05 to 5% by weight of the poly (oxypropylene) ammonium cationic surfactant.

46. The composition of claim 42, wherein the base polish further comprises at least one of an anionic surfactant and a nonionic surfactant.

47. A composition useful for imparting a glossy finish on a hard surface, the composition comprising:
 at least one poly(oxypropylene) ammonium cationic surfactant; and
 a base polish comprising an emulsifying agent.

48. The composition of claim 47, wherein the poly(oxypropylene) ammonium cationic surfactant comprises a compound of the formula:

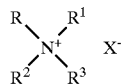

wherein R, $R^1$ and $R^2$ are independently selected from lower alkyl groups, $R^3$ comprises a (oxypropylene) chain, and $X^-$ comprises an anion.

49. The composition of claim 48, wherein the poly(oxypropylene) chain is a group comprising a formula selected from:

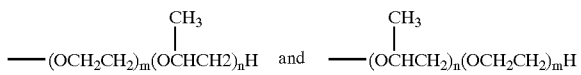

wherein m is from 0 to 30, n is from 1 to 60, and m+n is from 1 to 60, and n>1 m.

50. The composition of claim 47, wherein m+n is within the range of 5 to 60.

51. The composition of claim 47, wherein the composition comprises 0.05 to 5% by weight of the poly(oxypropylene) ammonium cationic surfactant.

52. The composition of claim 47, wherein the base polish further comprises at least one of an anionic surfactant and a nonionic surfactant.

53. A method of imparting a glossy finish on a vehicle surface, the method comprising:
applying a composition to the vehicle surface, the composition comprising a poly(oxypropylene) ammonium cationic surfactant and a base polish.

54. A method according to claim 53, wherein the vehicle surface comprises a surface of at least one of a car, a truck, a van, a bus, a railway train, a boat, a motorcycle, a snowmobile, and a trailer.

55. The method according to claim 53, wherein the poly(oxypropylene) ammonium cationic surfactant comprises a compound of the formula:

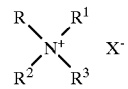

wherein R, $R^1$ and $R^2$ are independently selected from lower alkyl groups, $R^3$ comprises a poly(oxypropylene) chain, and $X^-$ comprises an anion.

56. The method according to claim 55, wherein the poly(oxypropylene) chain is a group comprising a formula selected from:

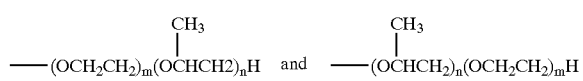

wherein m is from 0 to 30, n is from 1 to 60, and m+n is from 1 to 60, and n>m.

57. The method according to claim 53, wherein m+n is within the range of 5 to 60.

58. The method according to claim 53, wherein the composition comprises 0.05 to 5% by weight of the poly(oxypropylene) ammonium cationic surfactant.

59. The composition of claim 47, wherein the base polish further comprises at least one of an anionic surfactant and a nonionic surfactant.

* * * * *